(12) United States Patent
Balakrishnan et al.

(10) Patent No.: US 7,246,205 B2
(45) Date of Patent: Jul. 17, 2007

(54) SOFTWARE CONTROLLED DYNAMIC PUSH CACHE

(75) Inventors: Santosh Balakrishnan, Gilbert, AZ (US); Raj Yavatkar, Portland, OR (US); Charles Narad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 11/021,143

(22) Filed: Dec. 22, 2004

(65) Prior Publication Data

US 2006/0136671 A1    Jun. 22, 2006

(51) Int. Cl.
*G06F 13/14*    (2006.01)
*G06F 13/28*    (2006.01)

(52) U.S. Cl. .................. 711/138; 711/121; 711/122; 711/163; 710/18; 710/28

(58) Field of Classification Search ............. None
See application file for complete search history.

(56) References Cited

U.S. PATENT DOCUMENTS

| | | | | |
|---|---|---|---|---|
| 5,293,608 A | * | 3/1994 | Johnson et al. ............ | 711/136 |
| 6,157,955 A | | 12/2000 | Narad et al. | |
| 6,272,540 B1 | | 8/2001 | Yadav et al. | |
| 6,401,117 B1 | | 6/2002 | Narad et al. | |
| 6,421,730 B1 | | 7/2002 | Narad et al. | |
| 6,587,432 B1 | | 7/2003 | Putzolu et al. | |
| 6,601,082 B1 | | 7/2003 | Durham et al. | |
| 6,611,864 B2 | | 8/2003 | Putzolu et al. | |
| 6,625,689 B2 | | 9/2003 | Narad et al. | |
| 6,701,338 B2 | | 3/2004 | Narad et al. | |
| 6,711,650 B1 | * | 3/2004 | Bohrer et al. ............... | 711/118 |
| 6,728,265 B1 | | 4/2004 | Yavatkar et al. | |
| 6,735,702 B1 | | 5/2004 | Yavatkar et al. | |
| 6,804,717 B1 | | 10/2004 | Bakshi et al. | |
| 6,859,841 B2 | | 2/2005 | Narad et al. | |
| 6,877,065 B2 | * | 4/2005 | Galbraith et al. ........... | 711/113 |
| 6,922,754 B2 | * | 7/2005 | Liu et al. .................... | 711/138 |
| 2002/0188807 A1 | * | 12/2002 | Chaudhry et al. .......... | 711/128 |
| 2004/0004964 A1 | | 1/2004 | Lakshmanamurthy et al. | |
| 2004/0093602 A1 | | 5/2004 | Huston et al. | |
| 2004/0240472 A1 | | 12/2004 | Kumar et al. | |
| 2004/0240473 A1 | | 12/2004 | Kumar et al. | |
| 2005/0010676 A1 | | 1/2005 | Venkatachalam et al. | |
| 2006/0036810 A1 | * | 2/2006 | Accapadi et al. ........... | 711/132 |

* cited by examiner

*Primary Examiner*—Reginald Bragdon
*Assistant Examiner*—Tyler Willhite
(74) *Attorney, Agent, or Firm*—Daly, Crowley, Mofford & Durkee, LLP

(57) ABSTRACT

Methods, software and systems of dynamically controlling push cache operations are presented. One method, which may also be implemented in software and/or hardware, monitors performance parameters and enables or disables push cache operations depending on whether the performance parameters are within a predetermined range. Another method, which may also be implemented in software and/or hardware, monitors an amount of credits associated with a device and enables or disables push cache operations dependent upon whether the device has sufficient remaining credits.

38 Claims, 5 Drawing Sheets

SOFTWARE CONTROLLED DYNAMIC PUSH CACHE

CROSS REFERENCE TO RELATED APPLICATIONS

Not Applicable.

STATEMENT REGARDING FEDERALLY SPONSORED RESEARCH

Not Applicable.

BACKGROUND

A computer system typically includes one or more central processor units (CPUs), also referred to simply as processors. Processors are well known to those of ordinary skill in the art. One known technique used to improve CPU performance involves the use of caches. Two types of caches are typically used. The first type of cache is known as an L1 (Level-1) cache which typically resides in the processor core and improves performance by providing speedy access to data and instructions resident in the L1 cache(s). This saves the processor core from having to access main memory to obtain the desired data. L1 caches are typically small in order to achieve the desired speed. The second type of cache is known as an L2 (Level-2) cache. The L2 cache is larger, slower and requires larger access time than L1 cache, while still being smaller, faster and requiring less access time than main memory. Since the L2 cache is faster than memory, the L2 cache saves the processor from having to access main memory if the desired data is not in the L1 cache but is resident in the L2 cache. It is clear that such cache hierarchies are not limited to two levels but can be extended with larger and slower Level 3 caches, Level 4 caches and so on.

Another known technique for improving CPU performance involves a mechanism referred to as a push cache. Push cache is an architectural feature that allows devices or other processors to utilize cache push operations to push or write data directly into one or more of the CPU's caches while maintaining coherency with the main memory. The processor utilizes the cache data and avoids costly memory accesses thereby increasing the overall performance of the system. Devices designed to push selected data into a processor's cache(s) perform the push operation irrespective of the effect of the operation on the overall performance of the system. Thus, in certain scenarios, use of the cache push mechanism may significantly degrade system performance, for example by displacing from the cache previously pushed data that a program running on the CPU has not yet consumed; if for example the data is stored in a data structure that is accessed in First In/First Out (FIFO) order then the displaced data will again be moved back into the cache and accessed before the most recently pushed data is accessed, thus causing extra unnecessary delays and memory traffic.

Referring now to FIG. 1, a prior art system 10 supporting cache push operations is shown. A device 60 issues a write to memory 40 with control bits set to indicate that it is a cache push write operation. The bridge 50 updates the L2 cache 30. The L2 cache 30 updates the memory 40 later in order to maintain coherency between the memory and the L2 cache. Any data displaced or victimized from the L2 cache 30 as a result of the push operation is discarded or written by the L2 cache 30 to memory 40 as necessary in order to maintain coherency in the memory image. Any processor 20 accesses to the updated data would find the data available in the L2 cache 30, thereby avoiding a cache miss by the processor core in L2 cache 30. Alternately, the push operation updates both the L2 cache and main memory together. As should be clear to one skilled in the art the memory 40 might be a next-level cache accessed in common between the CPU and the device.

While the cache push mechanism offers significant performance gains, the efficiency of the cache push mechanism is dependent on two factors. A first factor is the timeliness of the data pushed. A second factor is the cost of victimizing other L2 cache entries as a result of a cache push operation.

The timeliness of the data pushed comes into effect in certain scenarios. In a cache push mechanism system, cache misses are reduced by proactively placing data into the L2 cache 30 thereby avoiding main memory accesses. However, if pushed cache data does not get accessed soon enough, the pushed cache data could end up being a victim of cache replacement, thereby nullifying any gain achieved by the cache push operation and instead incurring additional bus traffic due to the displacement of the pushed cache data and potentially also due to an update to memory with the cache data that was initially displaced by the push operation. Such cache replacement may occur due to processor demand wherein the CPU requests data which is not currently in the cache and the line containing the pushed cache data is displaced by it, or can also occur when another cache push operation occurs and previously pushed cache data is displaced by that act.

In prior art system 10 the peripheral device 60 might be configured to deliver received network packets into buffers in memory 40 along with packet metadata into descriptors also in memory 40, with both the packet data and the associated descriptors to be accessed by a network device driver running on the processor 20. A typical communications mechanism between a network interface such as gigabit Ethernet engine 60 and a processor 20 is one or more FIFOs implemented as data structures in memory 40, where the network interface writes to the tail of the FIFO and the processor 20 reads from the head of the FIFO. In a system implementing cache push capability the network interface might further be configured to push packet descriptors and some or all of the contents of the packet buffer to the cache(s) on one or more CPUs.

The peripheral device 60 may be provided as a gigabit Ethernet engine and the processor 20 may be a network processor. A gigabit Ethernet engine used with a network processor 20 typically implements an interrupt moderation scheme to ensure efficient packet processing at high packet rates. The interrupt moderation scheme ensures that the inter-interrupt interval increases as the packet rate increases. These schemes, while reducing the interrupt rate, also increases the number of packets and descriptors accumulated per interrupt. In turn, the potential of a pushed descriptor being victimized increases as the number of descriptors pushed between interrupts is concomitantly higher.

In normal operation of such a network interface and related device driver, the queue in memory provides for elasticity, or "smoothing" of the arrival rate of packets; the device driver does not have to keep up with the arrival of packets on a packet-by-packet basis but rather only needs to budget such that the processing time on average does not exceed the inter-arrival time on average of packets. Victimization of pushed but unaccessed packets and descriptors from the head of a queue due to subsequent cache push operations to the tail of that queue occurs when the cache is not dynamically able to contain the required depth of elasticity at a particular point in a bursty arrival of packets.

The cost of cache victimization due to cache push operations also comes into effect in certain scenarios. The cache unit treats a cache push operation similar to a cache line replacement operation from the processor core. A cache push operation could result in a cache line being victimized, the cache victim selected by the cache's particular replacement algorithm. If the location represented by the victimized cache line is of current or future interest to the code running on the processor 20, then the victimized cache line would subsequently be brought back into the cache as a result of an access by the processor 20 from memory 40. Thus, in this scenario, the push operation could result in a net increase rather than decrease in cache misses, thereby negatively impacting the overall system performance.

Thus, in systems that implement cache push operations, the use of cache push operations could be counterproductive, especially under high packet rate and high core processor load conditions. Using cache push operations under both these conditions could result in additional cache misses and associated main memory accesses. As the processor continues to receive data on its I/O interfaces, more data gets pushed, with the push operation increasingly victimizing the current working set resulting in more cache misses and more memory accesses. This cycle could continue eventually bringing the system to a halt under heavy load and I/O or causing packet loss due to increased processor stalls.

BRIEF DESCRIPTION OF THE DRAWINGS

The software controlled dynamic push cache will be more fully understood from the following detailed description taken in conjunction with the accompanying drawings, in which.

DETAILED DESCRIPTION

Figure 1:
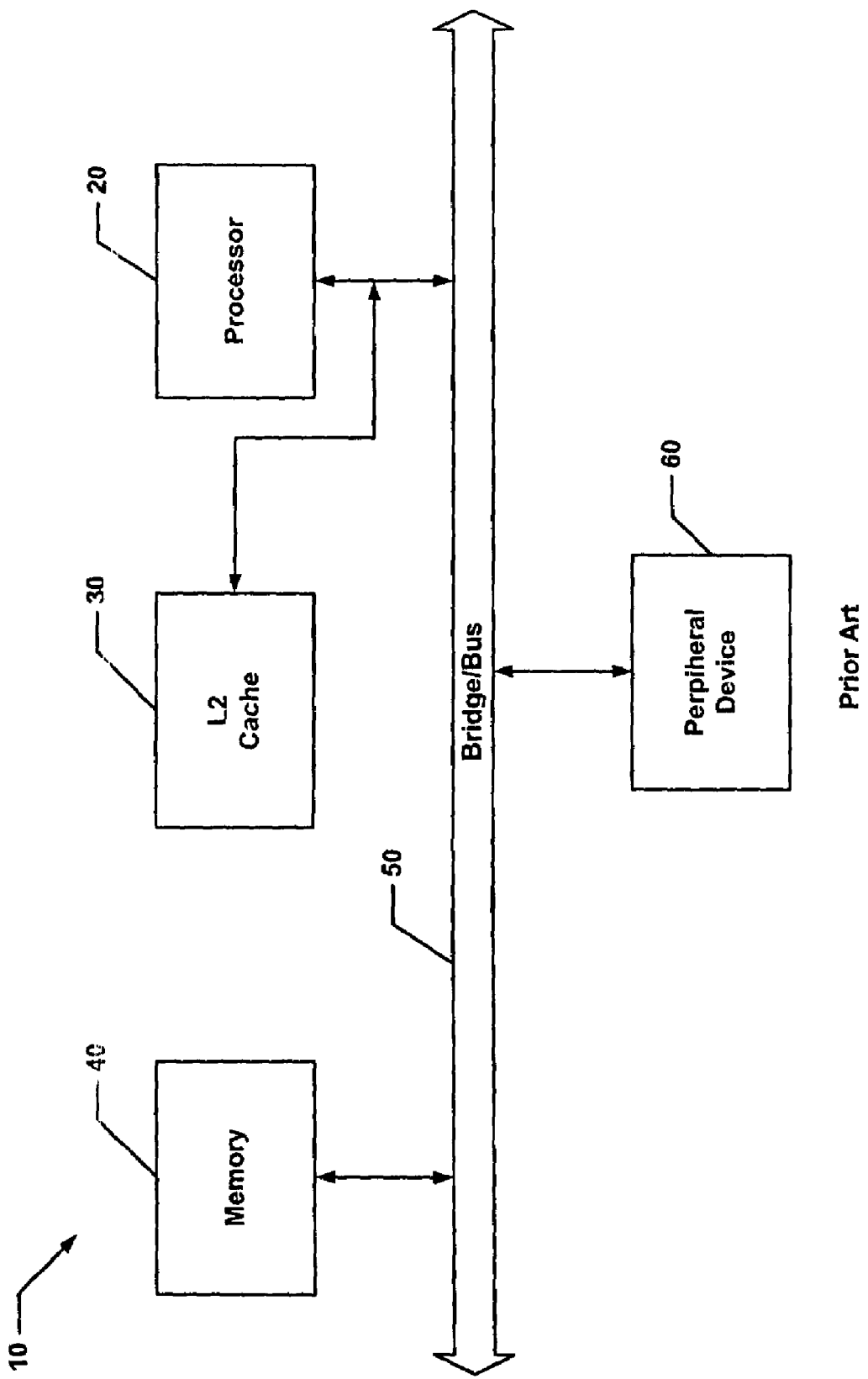
FIG. 1 is a block diagram of a prior art system incorporating a push cache.
Figure 2:
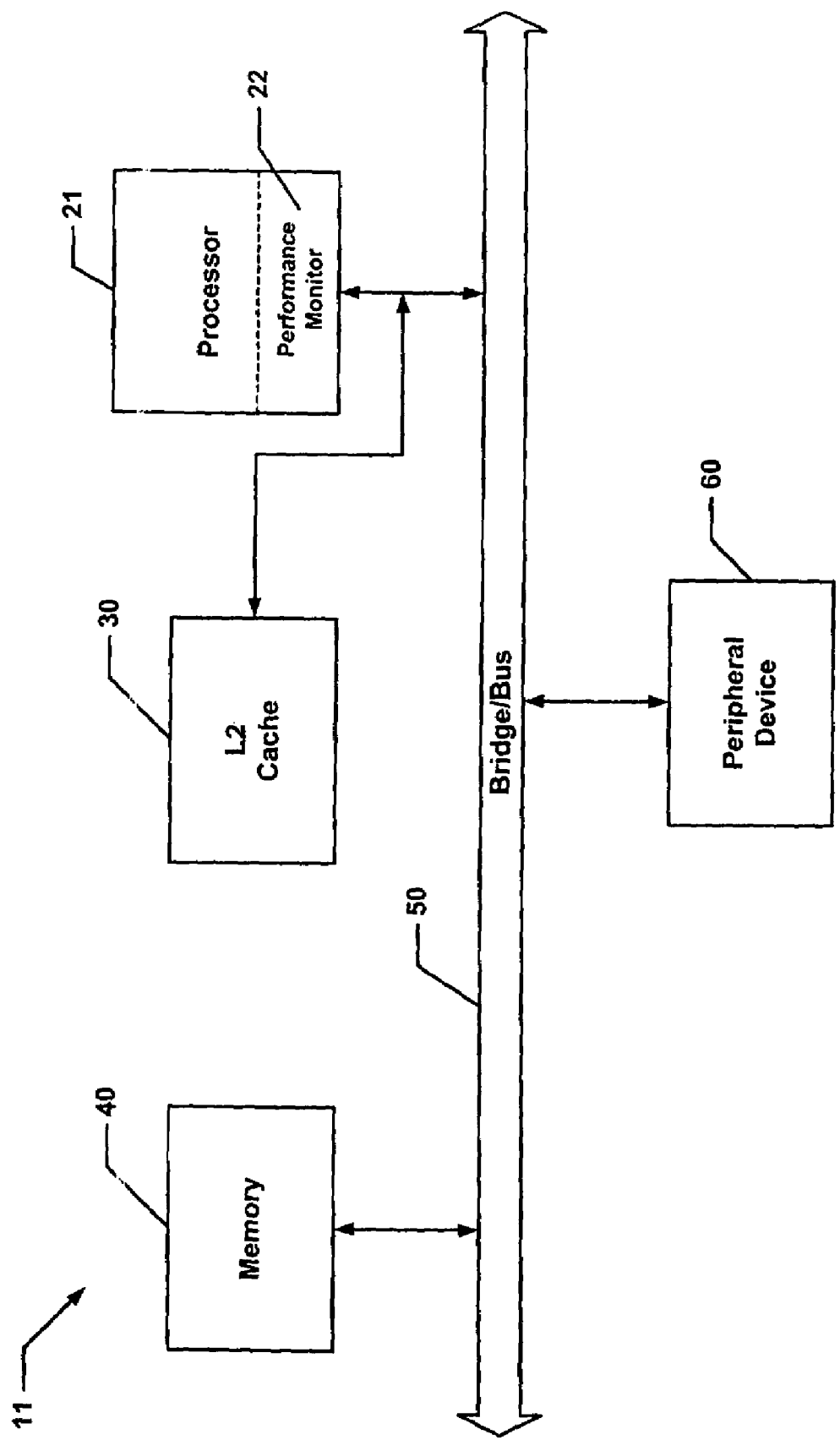
FIG. 2 is a block diagram of a first embodiment using a dynamically controlled push cache.

Referring now to FIG. 2, an exemplary processor having a dynamically controlled cache push mechanism in accordance with the embodiments disclosed herein is shown. A processor 21, memory 40 and peripheral device 60 are coupled to a bridge bus 50. An L2 cache 30 is coupled between the processor and bridge bus. In general, the processor includes a performance monitor module 22, or more simply a performance monitor 22, to monitor one or more processing and/or system parameters. By controlling the cache push operations based upon these parameters, performance-damaging cache push operations can be reduced and the benefits of push can be enhanced.

Before describing the inventive push cache embodiments disclosed herein, some processor concepts and components are discussed. Processor architectures typically include multi-level cache hierarchies that can include an L1 cache and an L2 cache. An L1 cache typically resides in the processor and improves performance by providing speedy access to data resident in the L1 cache. This saves the processor from having to access main memory to obtain the desired data. An L2 cache typically resides between the processor and the bus. The L2 cache is faster than memory, though not as fast as L1 cache. Since the L2 cache is faster than memory, the L2 cache saves the processor from having to access main memory if the desired data is not in the L1 cache but is resident in the L2 cache.

Apart from multi-level caches, these processor architectures also support a feature called push cache that allows devices to write data directly into one or more CPU cache(s) while maintaining coherency with main memory.

In a typical system without the push cache mechanism, the updated buffer descriptors and their associated buffers would be available in memory, and the first accesses by the CPU to the updated buffer descriptors and buffers would result in one or more cache misses, thereby requiring accesses to memory. In a processor that permits cache push operations, however, the peripheral device is programmed to place the buffer descriptors and some or all of the buffer contents directly in the CPU cache(s) thereby eliminating costly cache misses by the processor and improving system performance by reducing both processor stall cycles and bus and memory traffic. The amount of each packet that would be pushed rather than delivered to memory depends on how much of the packet the application typically accesses; for example just the headers or for another example the entire packet. In a system supporting cache push operations which also supports multiple processors with caches sharing a common main memory coherently, specific cache push operations maybe targeted at one or more caches in one or more CPUs based on some policy established in the network device.

A software controlled push cache utilizes an element of dynamic control of the policy for applying cache push operations, thereby eliminating the negative effects of cache push operations in the scenarios described above. In this methodology, cache push operations by devices are turned on or turned off depending on the performance parameters such as the current load on the processor core and the L2 cache hit rate. Turning on cache push operations under normal load conditions enables increased performance, while turning off cache push operations under heavy load conditions ensures that there isn't any degradation in performance due to the effects of pushing data into the cache(s). Alternatively the dynamic control might moderate the push rate by setting a policy for how frequently packets are pushed, for example as a percentage of packets or for another example based on a time period between pushes; in the case of such moderation packets which do not meet the criteria to be pushed are instead written to main memory. In a system in which cache push into different levels of a cache hierarchy can be explicitly controlled the policy may select to turn off cache push operations for example to an L1 Data cache while continuing cache push operations to an L2 cache.

Referring again to FIG. 2, a system 11 having a software controlled dynamic push cache is shown. This system includes a processor 21' that utilizes a performance monitor 22 for providing dynamic control of cache push operations. The performance monitor 22 comprises a software component on the processor 21' that monitors various performance parameters such as processor utilization and cache 30 efficiency to determine whether to enable or disable cache push operations or alternatively to moderate them by configuring a fixed policy in a network interface. By default, cache push operations are turned on for descriptors and for selected portions of packets. While processor parameters such as processor utilization and cache 30 efficiency are generally good indicators of overall processing performance, the performance monitor 22 may also use system parameters such as the amount of free buffers, the network packet arrival rate or other parameters found or derived in hardware and/or software to determine whether to enable or to disable cache push operations or alternatively whether to modify the current push moderation policy.

The performance monitor 22 may also use other mechanisms for managing cache push operations rather than just turning the cache push operations on or off or setting a fixed moderation policy. For example, in one embodiment 12 shown in FIG. 3, a predetermined amount of push cache credits 62' are assigned to a cache push capable peripheral device such as a micro engine 61' and cache push operations are moderated by managing the push cache credits. While a single cache push capable device 61 is shown, it should be appreciated that multiple cache push capable devices could be used, each with a respective amount of push cache credits. A device (such as device 61') is allowed to perform cache push operations only as long as the device has available credits. When the device is out of credits, the device is not allowed to perform cache push operations until the supply of credits for the device has been replenished; instead all writes issued by the device go to memory 40 if the device cannot buffer the writes until push credits are available. The performance monitor 22 can periodically replenish the credits 62' available with each device to allow the device to continue performing cache push operations.

In one embodiment, the performance monitor 22 comprises a software module implemented as part of the processor operating system. In another embodiment the performance monitor 22 comprises both a software module and a hardware module. The performance monitor 22 monitors one or more processor parameters, such as processor utilization and L2 cache hit rate, as well as system parameters, such as available free buffers and network packet arrival rate to determine whether to enable or disable cache push operations by devices (such as device 61'), or whether to change the current push moderation policy in the devices, or to determine for each device the number of credits to issue to it for performing cache push operations. The performance monitor provided in the processor is programmed to monitor events required to compute the processor parameters. System parameters, such as available free buffers or packet arrival rate on network interfaces, may be obtained from statistics information maintained by the operating system. Hardware parameters such as L2 cache hit rate may be obtained from hardware monitors associated with the L2 cache 30.

The processor utilization parameter indicates the percentage of cycles the processor core 21' spends in executing instructions. The processor utilization is computed as a ratio of the instruction cycles to the total core cycles. The total processor cycles counted by the performance monitor include instruction issue cycles, instruction fetch unit stalls, data dependency stalls, pipeline flushes and other non-compute cycles. Thus, a low processor utilization would typically indicate a large percentage of stalls possibly due to main memory accesses caused by cache misses.

A low L2 cache hit rate combined with low core utilization might indicate a situation where cache push operations should be turned off or moderated or the maximum number of credits to replenish lowered. Performance counters can also be configured to count the push accesses performed. Before issuing any command to the device to adjust cache push operations, the performance monitor might verify the number of cache push accesses as well.

In addition to monitoring processor parameters such as core utilization and L2 cache hit rate, the performance monitor may also monitor system parameters such as available free buffers and network packet arrival rate to determine whether to enable or disable or otherwise modify cache push operations. The system parameters might be maintained as running averages to ensure that the performance monitor reacts to overall system behavior and not to transient behavior. Both system and processor parameters should be taken into consideration before modifying the device behavior since a low value for individual parameters by themselves do not necessarily indicate sub-par push cache performance. For example, a context switch might cause the CPU 20 to access data and instructions which have not recently been accessed, leading to a temporarily increased cache miss rate.

The function to determine whether to reconfigure the policy for cache push operations might be tuned from system to system to reflect application characteristics. Predetermined criteria, such as a specific threshold value or a range of values defined by an upper and lower threshold, could be set for each individual parameter. The performance monitor itself is realized as an Operating System (OS) service enabled and scheduled according to specific OS configuration parameters. The OS may also define programming interfaces provided by a driver to facilitate policy reconfiguration of cache push operations. The monitoring function would use these interfaces to enable or disable cache push operations, or to change a moderation policy for cache push operations, or to adjust the maximum number of push credits for each device.

Figure 3:
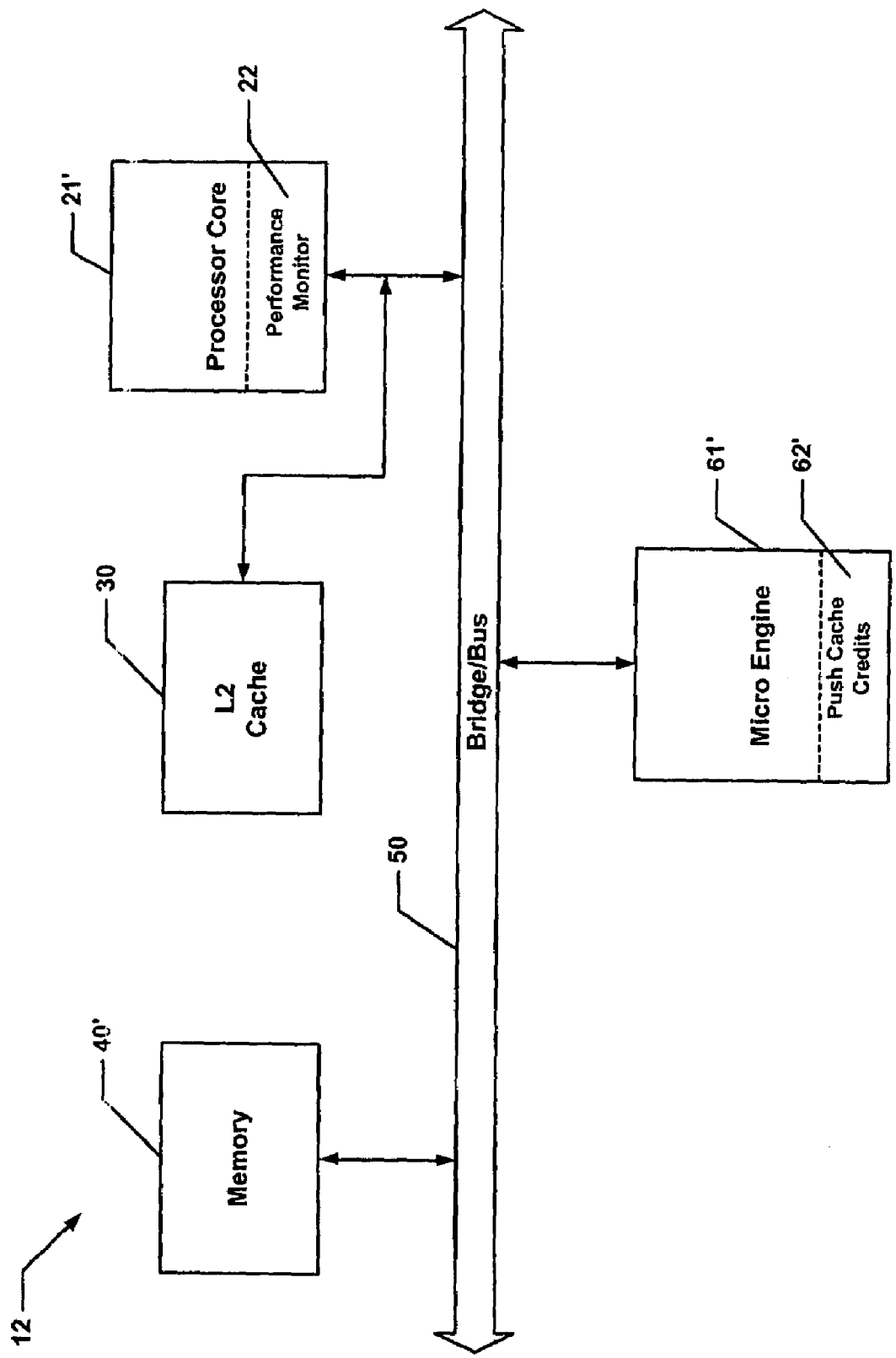
FIG. 3 is a block diagram of a second embodiment using a dynamically controlled push cache.

The embodiment shown in FIG. 3 may also represent a scenario in which the system comprises a network processor (NP) system. A network processor typically includes built-in devices such as 10/100, Gigabit Ethernet, and ATM interfaces. The NP can further include one or more Gigabit Ethernet engines 61' which may be provided as Micro Engines (MEs) 61', associated I/O interfaces, a processor core 21' and one or more internal and/or external memories 40'. In one of the operating modes of the NP, the ME 61' is programmed to act as Gigabit Ethernet engine with Transmission Control Protocol (TCP) offload functions. In this mode the gigabit Ethernet engine acts as a Direct Memory Access (DMA) engine writing and reading data to and from memory. The processor core 21' and the gigabit Ethernet engine 61' exchange buffers and control information via a set of buffer descriptors. The descriptors and buffers are allocated by the processor core 21' and maintained in processor memory 40', the descriptors are organized into transmit and receive descriptor data structures, and the locations of these structures are passed on to the gigabit Ethernet engine 61'. The gigabit Ethernet engine 61' retrieves the descriptors, the buffer addresses and related control information from memory. On completing a transmit or receive operation, the gigabit Ethernet engine 61' writes back the descriptors to processor memory 40' with updated status information, periodically interrupting the processor core 21' to indicate the presence of updated descriptors. The processor core 21' retrieves the updated descriptor(s) and performs necessary processing. The processing occurs because of (a) an interrupt or (b) traversing a ring/queue after an interrupt or (c) polling of a ring/queue for updated descriptors.

Figure 4:
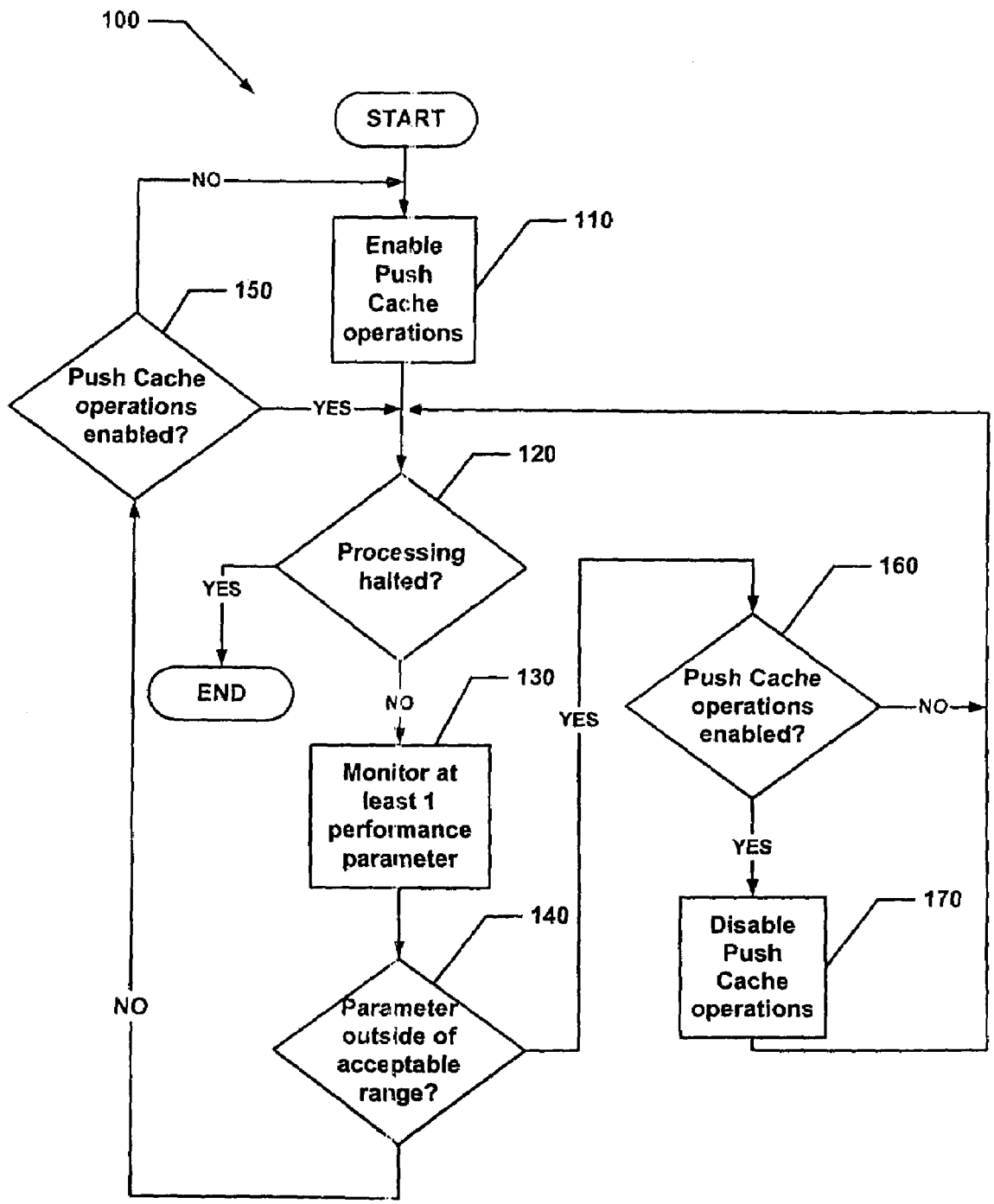
FIG. 4 is a flow chart of a first method of providing a dynamically controlled push cache.
Figure 5:
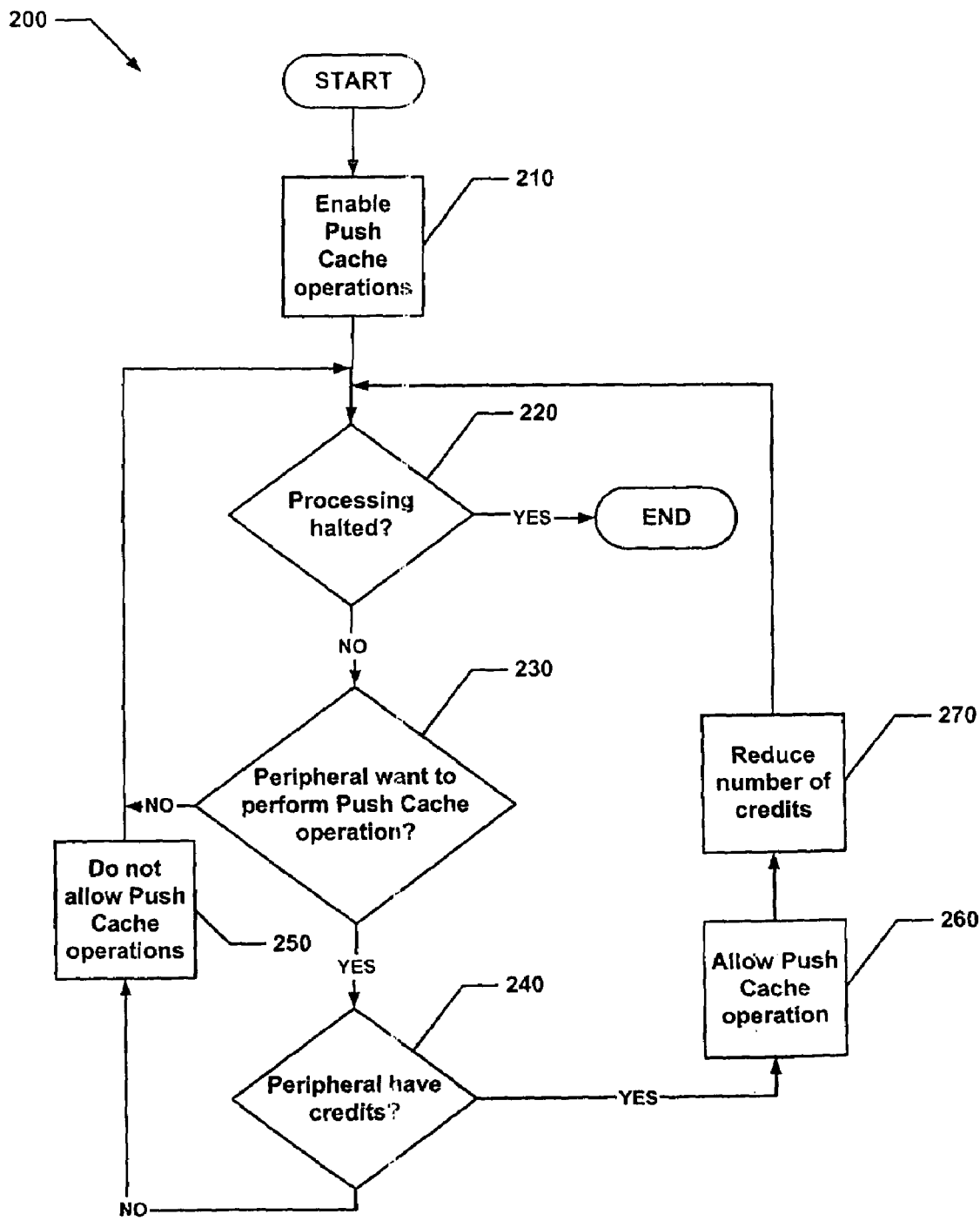
FIG. 5 is a flow chart of a second method of providing a dynamically controlled push cache.

A flow chart of the presently disclosed method for dynamically controlling cache push operations is depicted in FIGS. 4 and 5. The rectangular elements are herein denoted "processing blocks" and represent computer software instructions or groups of instructions. The diamond shaped elements are herein denoted "decision blocks" and represent computer software instructions or groups of instructions which affect the execution of the computer software instructions represented by the processing blocks.

Alternatively, the processing and decision blocks represent operations performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present software controlled push cache. It should be noted that many routine program elements, such as initialization of loops and variables and the use of temporary variables are not shown. It will be appreciated by those of ordinary skill in the art that unless otherwise indicated herein, the particular sequence of executing the processing blocks and decision blocks described is illustrative only and can be varied. Thus, unless otherwise stated the execution of the processing blocks and the decision blocks described below are unordered meaning that, when possible, the execution can be performed in any convenient or desirable order.

Referring now to FIG. 4, a first method 100 of implementing a software controlled dynamic push cache is shown. The method 100 starts and processing block 110 is executed. In processing block 110 cache push operations are enabled. In one embodiment, this is the default setting for cache push operations.

In decision block 120 a determination is made whether processing has halted. When processing has halted, the process ends. When processing is ongoing, processing block 130 is executed in which at least one performance parameter is monitored. The performance parameter may include processor parameters such as processor utilization and L2 cache hit rate and/or system parameters such as the amount of free buffers and the network packet arrival rate.

In processing block 140, a determination is made whether any of the parameters fall outside of an acceptable range. When the parameters are not outside of an acceptable range then decision block 150 is executed. When the parameters are outside of an acceptable range then decision block 160 is executed.

A determination is made in decision block 150 whether cache push operations have been enabled. If cache push operations are enabled, then processing continues with decision block 120. If cache push operations are not enabled, the processing continues with processing block 110.

In decision block 160 a determination is made whether cache push operations have been enabled. If cache push operations are not enabled then processing continues with decision block 120. If cache push operations are enabled then processing continues with processing block 170 where cache push operations are disabled, and processing continues with decision block 120.

Referring now to FIG. 5, a second method 200 of operating a software controlled dynamic push cache is shown. The method 200 starts and processing block 210 is executed. In processing block 210 cache push operations are enabled. This is the default setting for cache push operations.

In decision block 220 a determination is made whether processing has halted. When processing has halted, the process ends. When processing is ongoing, decision block 230 is executed in which a determination is made whether a device is intending to perform a cache push operation. If the device is not intending to perform a cache push operation then processing continues at decision block 220. If the device is intending to perform a cache push operation then decision block 240 is executed.

A determination is made in decision block 240 regarding whether the device has credits. When the device does not have credits, processing continues with processing block 250. In this case the device might perform writes to memory rather than cache push operations. Alternatively the device might temporarily buffer the data until sufficient push credits are available. When the device does have credits, processing continues with processing block 260.

In processing block 250, since the device has no credits, cache push operations are disabled. Processing continues with decision block 220.

In processing block 260, since the device has remaining credits, cache push operations are allowed. Processing continues with processing block 270 in which the number of credits allocated to the device is reduced to reflect issued cache push operations, and processing continues with decision block 220.

Having described particular embodiments of the software controlled dynamic push cache, it will now become apparent to those of ordinary skill in the art that other embodiments incorporating these concepts may be used. Additionally, the software included as part of the software controlled dynamic push cache may be embodied in a computer program product that includes a computer useable medium. Such a computer usable medium can include, for example, a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the software controlled dynamic push cache should not be limited to the described embodiments but rather should be limited only by the spirit and scope of the appended claims.

What is claimed is:

1. A system comprising:
   a processor;
   a cache coupled to the processor; and
   a device configured to dynamically control delivery of data to the cache in a push cache operation based on a utilization parameter associated with utilization of the processor.

2. The system of claim 1 wherein the device is further configured to dynamically control delivery of data to the cache based on a hit rate parameter associated with the cache.

3. The system of claim 1 wherein the device is further configured to dynamically control delivery of data to the cache based on a system parameter.

4. The system of claim 3 wherein the system parameter comprises a system parameter associated with the availability of free buffers.

5. The system of claim 3 wherein the system parameter is determined based on a running average.

6. The system of claim 5 wherein the system parameter is a running average of the arrival rate of packets.

7. The system of claim 1 wherein the cache is a Level-2 cache.

8. The system of claim 1 wherein the utilization parameter indicates a percentage of cycles the processor spends in executing instructions.

9. The system of claim 8 wherein the utilization parameter is a ratio of instruction cycles to total processor cycles.

10. The system of claim 1 wherein the device is further configured to dynamically control delivery of data to the cache based on a number of push cache operations made to the cache.

11. The system of claim 1 wherein the processor is configured to issue credits and the device is configured to moderate delivery into the cache based upon credit availability.

12. The system of claim 1 wherein the processor comprises a performance monitor configured to issue credits to the device configured to perform a push cache operations and moderates delivery to the cache based upon credit availability of the device.

13. The system of claim 12 wherein an amount of credits associated with the device is reduced when the device performs a push cache operation.

14. A method comprising:
monitoring a utilization parameter associated with utilization of a processor; and
dynamically controlling delivery of data to a cache coupled to the processor in a push cache operation based on the utilization parameter.

15. The method of claim 14 further comprising monitoring a hit rate parameter associated with the cache,
wherein dynamically controlling delivery comprises dynamically controlling delivery to the cache based on the utilization parameter and the hit rate parameter.

16. The method of claim 15, further comprising monitoring a system parameter,
wherein dynamically controlling delivery comprises dynamically controlling delivery to the cache based on the utilization parameter, the hit rate parameter and the system parameter.

17. The method of claim 16 wherein monitoring a system parameter comprises monitoring a system parameter associated with the availability of free buffers.

18. The method of claim 17 wherein monitoring a system parameter comprises monitoring a running average.

19. The method of claim 18 wherein monitoring a system parameter of the system comprises monitoring a network packet arrival rate.

20. The method of claim 14 wherein monitoring a utilization parameter comprises monitoring a utilization parameter indicating a percentage of cycles the processor spends in executing instructions.

21. The method of claim 20 wherein monitoring a utilization parameter indicating a percentage of cycles the processor spends in executing instructions comprises monitoring a ratio of instruction cycles to a total processor cycles.

22. The method of claim 14, further comprising monitoring a number of push cache operations made to the cache,
wherein dynamically controlling delivery comprises dynamically controlling delivery to the cache based on the utilization parameter and the number of push cache operations.

23. The method of claim 14 wherein dynamically controlling delivery comprises determining if the utilization parameter is within a range defined by a lower threshold and an upper threshold.

24. A method of dynamically controlling push cache operations comprising:
generating credits based on a utilization parameter associated with utilization of a processor;
monitoring an amount of the credits associated with a device configured to perform a push cache operation with a cache coupled to the processor and to the device;
disabling push cache operations when the device does not have available credits; and
enabling push cache operations by the device when the device has available credits.

25. The method of claim 24 further comprising reducing the amount of credits associated with the device in response to the device performing a push cache operation.

26. The method of claim 24 further comprising replenishing a supply of credits associated with the device seeking to perform push cache operations.

27. The method of claim 26 wherein credits are replenished on a periodic basis.

28. The method of claim 26, further comprising monitoring a system parameter and generating credits based the system parameter.

29. The method of claim 28 wherein the system parameter corresponds to available free buffers.

30. The method of claim 28 wherein the system parameter corresponds to a network packet arrival rate.

31. An article comprising:
an electronic storage medium having stored instructions causing a machine to:
monitor a utilization parameter associated with utilization of a processor; and
dynamically controlling delivery of data to a cache coupled to the processor in a push cache operation based on the utilization parameter.

32. The article of claim 31 wherein the electronic storage medium further comprises instructions causing a machine to monitor a hit rate parameter associated with the cache, wherein instructions causing a machine to dynamically control delivery comprises instructions causing a machine to dynamically control delivery to the cache based on the utilization parameter and the hit rate parameter.

33. The article of claim 32 wherein the electronic storage medium further comprises instructions causing a machine to monitor a system parameter, wherein instructions causing a machine to dynamically control delivery comprises instructions causing a machine to dynamically control delivery to the cache based on the utilization parameter, the hit rate parameter and the system parameter.

34. The article of claim 31 wherein the electronic storage medium further comprises instructions causing a machine to monitor push cache operations made to the cache, wherein instructions causing a machine to dynamically control delivery comprises instructions causing a machine to dynamically control delivery to the cache based on the number of push cache operations.

35. The article of claim 31 wherein instructions causing a machine to dynamically control delivery comprises instructions causing a machine to dynamically moderate delivery into the cache based upon credit availability.

36. An article comprising:
an electronic storage medium having stored instructions causing a machine to:
generate credits based on a utilization parameter associated with utilization of a processor;
monitor an amount of the credits associated with a device configured to perform a push cache operation to a cache coupled to the processor;
disable push cache operations by the device when the device does not have available credits; and enable push cache operations by the device when the device has available credits.

37. The article of claim 36 wherein the electronic storage medium further comprises instructions causing a machine result to reduce the amount of credits associated with the device based on a push cache operation.

38. The article of claim 36 wherein the electronic storage medium further comprises instructions causing a machine to generate credits associated with the device performing a push cache operation.

* * * * *